June 4, 1963   J. J. BLACK   3,092,220
FLOOR CONSTRUCTION FOR REFRIGERATED ROADWAY VEHICLE
Filed Dec. 3, 1959   3 Sheets-Sheet 1

INVENTOR.
James J. Black.
BY Wood, Herron & Evans.
ATTORNEYS.

INVENTOR.
James J. Black.
BY Wood, Herron & Evans,
ATTORNEYS.

INVENTOR
James J. Black
BY Wood, Herron & Evans
ATTORNEYS.

United States Patent Office 3,092,220
Patented June 4, 1963

3,092,220
FLOOR CONSTRUCTION FOR REFRIGERATED
ROADWAY VEHICLE
James J. Black, Cincinnati, Ohio, assignor, by mesne assignments, to Pullman Incorporated, a corporation of Delaware
Filed Dec. 3, 1959, Ser. No. 857,193
3 Claims. (Cl. 189—34)

This is a continuation-in-part of my copending application Serial No. 645,241 filed March 11, 1957, now Patent No. 2,923,384.

This invention relates to truck and trailer vehicles of the refrigerated type, that is vehicles equipped with apparatus for circulating a stream of chilled air over perishable cargo such as foodstuffs or the like while the cargo is being transported.

The principal objective of the present invention has been to provide a vehicle floor system upon which cargo may be supported but through which air may be conducted to or from the refrigerating system.

In the conventional refrigerated type of truck or trailer a power-driven fan discharges air over the expansion coils of a refrigerating system by means of which the air is cooled and is then discharged into the vehicle, usually near the ceiling thereof or above the top of the cargo level. The cold air is intended to flow around the cargo and maintain the cargo at a suitably low temperature. In some instances the cargo is supported on a floor having longitudinally extending channels which respectively communicate with the suction side of the air fan whereby air which has been warmed in passing over the cargo may be circulated to the fan for recooling. In actual practice, systems of this type fall far short of the theoretical expectations; difficulties arise because cargo cannot be loaded into the large floor area of the vehicle with the uniformity of spacing that is requisite to obtain uniformity of air flow or uniformity of cooling over and around the cargo units.

In accordance with this invention, a trailer vehicle is provided with an air circulating floor system, which in and of itself is of nominal height whereby maximum cargo capacity is provided, through the provision of a plurality of vertical webs extending longitudinally of the vehicle from one or more bottom panels which form a primary closure for the bottom of the vehicle body. The webs at their upper extremities have one or more sidewise flanges; these reside in flush relation to one another and constitute a cargo-carrying floor for the vehicle. However, the edges of the flanges are spaced from one another so as to provide slots extending longitudinally of the vehicle. Air filtering over the cargo resting on the floor may pass through the slots (whereever they are uncovered) and into the channelways between adjacent webs, and the ends of the channelways are in communication with the air circulating fan of the refrigerating system.

In addition, however, an important advantage of this invention is based upon the discovery and determination that cargo loaded into the vehicle can be maintained at substantially uniform temperature regardless of the care with which the cargo may be packed into the vehicle by providing slots or apertures at spaced intervals in the webs of the flooring, through which air entering one channelway may flow to and through other channelways in its return to the forced air system.

In respect to refrigerating efficiency, the advantages which the present invention provides can best be understood in relation to the conditions under which cargo requiring refrigeration is loaded into vehicles having floor ducts of conventional construction. When crates or baskets, containing vegetables or oranges for example, are brought into the vehicle, they are placed upon the floor and succeeding layers are placed on top of one another usually in random pattern until the vehicle is fully loaded. Some of the crates may completely cover the individual floor duct openings. At other areas some of the floor duct openings will be accessible to air passing circuitously through the cargo from higher levels.

If it happens, as it frequently does happen, that some of the floor ducts are accessible to air only at points near the circulating fan, the air, following paths of least resistance, will flow unevenly through those areas, short-circuiting the rest of the cargo. In other instances certain of the floor ducts may be open to air flow at points in the vehicle which are distant from the circulating fan, but the duct passageways leading to the circulating fan from such points can only carry so much air volume at the given pressure differential provided by the fan, and the result will be that the air circulating system is relatively starved because of an inadequate return air supply, that is, the ducts to which air can gain entrance are individually too small to carry the air volume necessary to maintain the desired temperature. When this occurs the rate of heat removal from the vehicle interior will fall and the cargo may become spoiled; this is particularly likely to occur if the floor air passageways adjacent the side walls of the vehicle are covered, since the entrance of heat into the vehicle from the exterior will be greatest at those areas.

In accordance with this invention, improved over-all efficiency of the refrigerating system is achieved by providing a floor system including spaced webs as previously described in conjunction with cross apertures in the webs through which air capable of entering any channelway between adjacent webs through some open floor slot portion thereof may flow from that channelway to an adjacent channelway or even to a channelway spaced an appreciable distance from the one it entered, whereby each channelway may function to carry air to the air circulating fan whether the air enters the same directly through an open floor slot portion thereof or indirectly through the web apertures from adjacent channels having open slot portions. Thus, all of the air which is accessible from the circulating fan is readily returned to the refrigerating system. In other words, the pressures at the delivery end of each channelway of the floor, whether negative or positive depending on the type of system used, are equalized, and air entering into the cross communicating floor duct system at any point will find its passage either directly or circuitously through the floor, no matter where it enters the system. In substance, the simple cross passages in the webs have been found to prevent starving of the refrigeration system and to provide against overloading of the channelways in the floor system. If the cargo is loaded into the vehicle in such manner as to provide at least some open slots, even at the very ends of the channelways, it has been determined that enough chilled air will pass over, around, or adjacent the cargo units to maintain all of them at temperatures below the permissible limit of safety.

Even though apertures are provided at spaced intervals in the vertical webs of the floor system, the webs, connected to the bottom panel at their lower extremities and flanged at the top, provide a floor system which is of minimum height but which is strong. In the preferred practice of this invention, the floor for a vehicle is made up of a plurality of floor sections, each made of extruded aluminum for example, which sections are of substantially duplicate configuration in cross section but which have interlocking means at their sidewise longitudinal extremities whereby a plurality of sections may be joined longitudinally with one another to form a continuous floor. Also, since cross apertures cannot be provided in the webs as they are extruded, the section as extruded may be generally semi-circular or inverted V formation so as to dispose the webs radially or angularly with respect to one another whereby space between the webs is provided to permit a suitable tool such as a punch, drill, or end mill to enter each web and pierce the same crosswisely. After the apertures are provided in the webs of a section, the section is then flattened so that the bottom panel is straight and the tops of the flanges of the respective webs are flush with one another, in which condition the section is joined edgewisely to a section similarly fabricated.

In refrigerated vehicles of the type to which the present invention is directed, the subfloor over which the floor of the present invention is located includes a thick layer of heat insulating material. It is necessary to maintain such insulating material relatively dry for, when the material becomes wet, its heat insulating qualities are greatly reduced. It has, therefore, been an objective of this invention to provide a floor covering from extruded sections, the extruded sections having means for joining one section to the other to prevent leakage of water between the two sections.

In the original application, Serial No. 645,241, referred to above, the design of the joint between adjacent sections was such that the apertures in the webs forming the communication between adjacent sections had to be located above the interlocking joint. The present invention provides an improvement in the strutcure disclosed in the original application. The interlocking joint between adjacent sections has been improved by spacing the same from the webs of the longitudinal beam construction. This construction permits water formed by condensation in the cargo body to flow freely through the webs and thereby avoids any undesirable build-up of water between adjacent webs.

The new construction also permits the use of larger apertures in that the present invention imposes no restriction on the vertical dimension of the apertures while permitting apertures of larger size to be used without impairment of the load supporting strength of the extruded floor panels.

These and other objectives of the invention will become readily apparent from the following detailed description taken in conjunction with the accompanying drawings in which.

Figure 1:
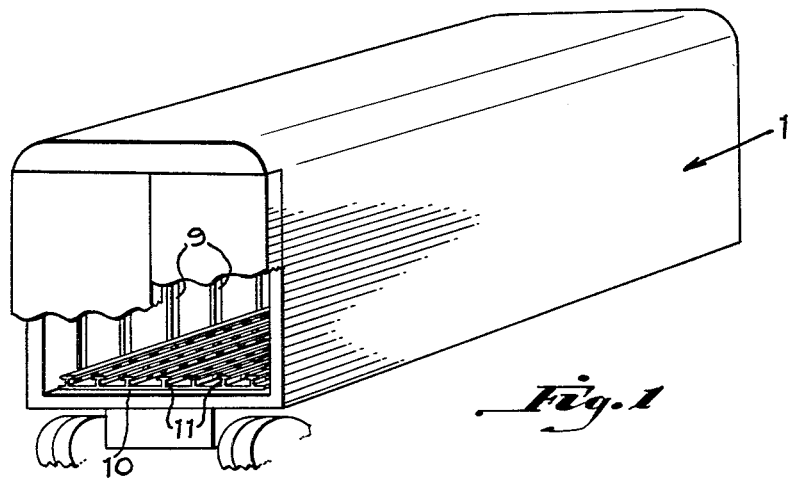
FIG. 1 is a perspective view of a trailer vehicle having a floor constructed in accordance with the present invention.
Figure 2:
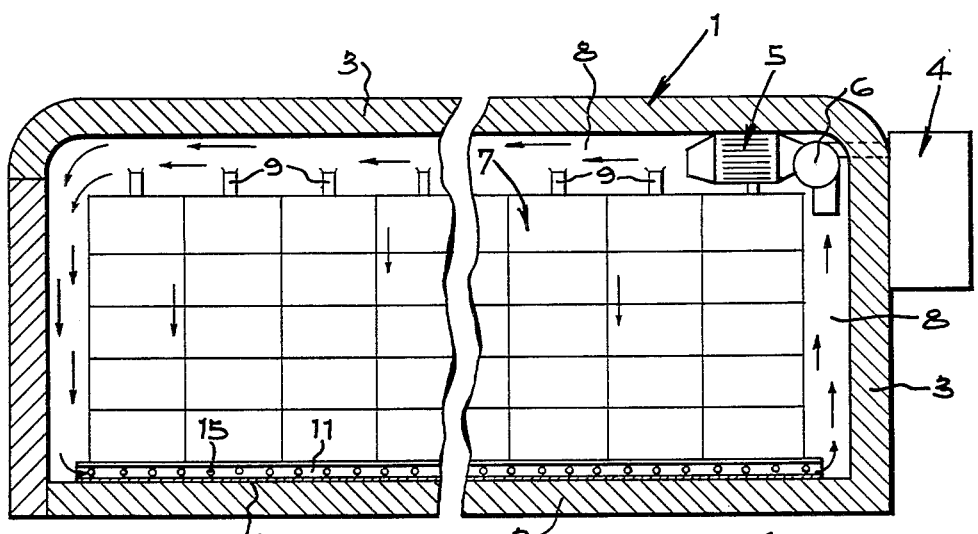
FIG. 2 is a diagrammatic view taken longitudinally through a trailer vehicle equipped with an air cooling system and having a floor constructed in accordance with the present invention.
Figure 3:
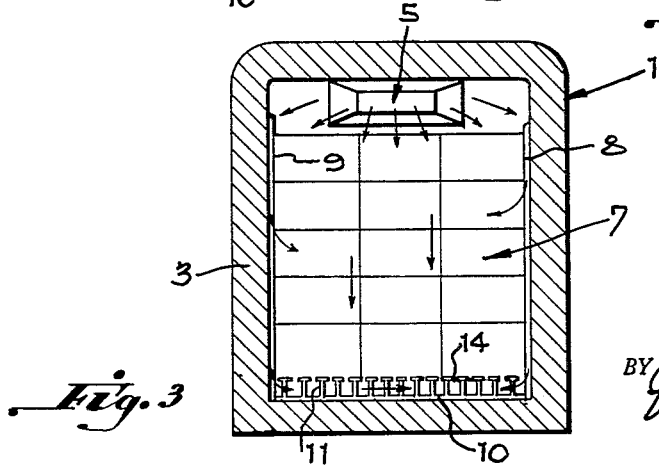
FIG. 3 is a view similar to FIG. 2 showing the vehicle body in transverse cross section.

The body 1 of the vehicle shown in FIGURES 1-3 may be of conventional construction, for which reason its details are not herein disclosed. It will be understood that the body is mounted on a wheeled frame or chassis having side channels or longitudinal beams, cross bolsters, or other structural members for supporting the body and the floor thereof. The body of a vehicle intended for refrigeration service usually includes thermal insulation indicated generally at 3 at the walls and roof as well as beneath the load-supporting floor.

In a typical vehicle of refrigerated type, an engine-driven compressor unit, indicated generally at 4, is located in an elevated position at the front end to supply refrigerant to expansion coils indicated generally at 5 over which a stream of air is forced by means of a blower 6 driven from the compressor engine. The fan, usually located near the roof, propels a stream of chilled air over the cargo which is illustrated diagrammatically at 7. The fan 6 is supplied with air from a manifold space 8 located at the front end of the trailer, which may be provided either by a bulkhead or partition or by spacing the front end cargo from the front wall. Similarly, ribs or channels 9 arranged at intervals along the side walls space the cargo from the side walls so as to allow air to flow downwardly along the side walls.

In FIGURES 2 and 3 the cargo 7 is indicated generally by the cross lines, but it will be understood that perishable cargo of the type requiring refrigeration during transport cannot be stacked in such orderly and compact fashion; for example, round bushel baskets or bulged crates containing vegetables or fruit will inherently have spaces therebetween through which air can move.

In accordance with the present invention, a load-sustaining, air-conductive floor is provided upon which cargo may be loaded but also into and through which air may pass to the fan inlet manifold area 8, not only from the rearmost end of the cargo but at whatever intermediate areas the air under the positive head pressure of the fan discharge and the negative inlet pressure of the fan may filter downwardly through passages in the mass of cargo wherever the cargo units are spaced from one another. This floor system, in the preferred mode of construction, comprises an assembly of individual floor sections. Each section comprises a bottom panel portion or base 10 having a flat, lower face adapted to be fastened to and supported by structural members of the chassis extending longitudinally or transversely thereof or both. From the bottom panel portion of each section a plurality of webs 11 extent vertically in spaced relationship to one another. The section, by way of example, may be made approximately 12" in over-all width to facilitate extrusion and convenience in handling, or some dimension of approximately the same magnitude which is modular with respect to vehicle width. Each section may extend throughout the length of the vehicle in which it is to be installed or sections of intermediate length may be employed.

The webs 11, spaced from one another, provide channelways 12 extending from one end of the floor system to the other. At their upper extremities, the webs 11 are of T formation, embodying flanges 13, 13 which extend in horizontal direction from opposite sides thereof or from one side only if desired. The upper surfaces of these flanges are flush with one another and constitute the floor on which cargo units may be placed. However, the flanges 13 of adjacent webs terminate short of one another, thereby providing longitudinal slots 14 through which air may enter the channelways 12 from areas above the floor.

It will be seen that the cargo resting upon the flanges 13 of the floor sections will cover many of the slot areas 14, but that air passing through spaces between cargo units in its movement toward the floor will be able to enter any uncovered slot areas of the floor system which are in communication with such spaces either directly or through intermediate passageways in the mass of cargo. At the prevailing air pressure supplied or induced by the fan, each channelway 12 can only carry so much air, and if it happens that cargo is loaded onto the floor in such manner that only a few of the floor slots are accessible to air from the fan, the channelways communicating with other slots will be inactive and the rate of air circulation will be governed by the limited capacity of the lesser number of channelways to which air can pass. Conditions of this type frequently occur adjacent the side walls of the vehicle where the need for cooling air is greatest to conduct away the heat transmitted through the metal structure of the side walls. Some air always will pass over the entire top of the cargo and move to the floor at the rear and return through the channelways to the inlet manifold at the front, but it is desirable to promote the passage of air around the cargo units intermediate the ends from the ceiling to the floor.

To promote air circulation notwithstanding closure of some of the air slots by cargo loaded thereon, the webs 11 of the floor sections are provided with apertures 15 extending therethrough. In the preferred structure the apertures are located beneath the flanges 13 of the webs in spaced relationship to one another throughout the lengths of webs. By this means any channelway which is closed by cargo covering its slots in whole or in part is available to accept or induce air from any channelway which is open to air but which is otherwise loaded to the limit of its air carrying capacity. The negative pressures at the outlet ends of the channelway are equalized and all channelways function to carry air to the fan even though the slots in the floor are open at only certain points or areas. By this means an adaquate supply of air to the inlet side of the fan is provided and the efficiency of the refrigerating system is maintained.

Figure 4:
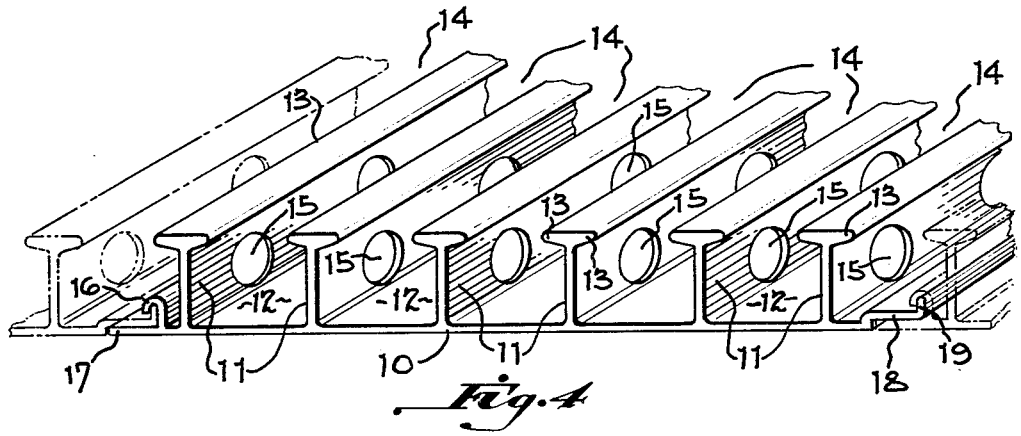
FIG. 4 is a perspective view showing a floor section of interlocking type adapted for connection with floor sections of similar construction at its longitudinal edges.

From the structural point of view, it is preferred to equip the edges of the floor sections with upstanding male and female interlocking flanges through which the sections may be joined to one another in such manner that the bottom panel portions of adjoined sections form a virtually air-tight membrane. As shown in FIG. 4, the interlocking flange structure along one edge, i.e., the left, comprises a continuous hook portion 16 extending upwardly from the bottom panel portion outwardly and then downwardly. From FIG. 4 it can be seen that the hook portion 16 is spaced from the outermost web 11 of each section and projects a substantial distance above the bottom panel portion 10. Since the hook portion 16 extends continuously along the length of each individual section, the hook portion 16 forms a retaining wall or dam preventing water from flowing into the joint between the sections which the interlocking members provide.

A ledge 17 projects beyond the hook portion 16. The ledge and hook portion provide a cavity to receive a male strip 18 having an upwardly directed flange 19, the strip and flange 19 being mounted at the right side of each section as viewed in FIG. 4.

Figure 5:
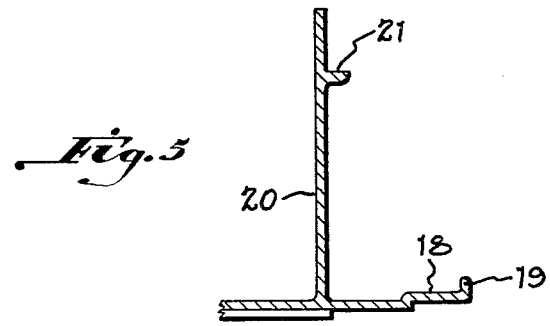
FIG. 5 is a cross sectional view of an adapter section for use at the juncture of the floor system and a vehicle side wall.

To assemble and interlock the sections, each may be slid longitudinally onto the adjacent section or, as in the arrangement disclosed, the connection can be made by angulating one section laterally to the other so that the upper edge of the longitudinal male strip 18 can be entered, continuously, into the longitudinal hook portion 16 of the adjacent section, after which the angulated section may be reclined to the same plane. In either manner, as many sections may be joined as are necessary to provide a floor over the entire area of the vehicle. When the sections are in the same plane, the upper surface of the edge 17 of each rests facially against the lower surface of strip 18 of the adjacent section. Thereby seals are formed which are effectively at the normal air pressure provided from the refrigeration system fan to prevent air leakage through the bottom of the floor system to the exterior of the vehicle.

Where the outermost floor section at each side of the vehicle meets the vehicle side wall, a corner extrusion of the type shown in FIG. 5 may be utilized. This comprises a locking structure of the male or female type, as needed to accommodate a section of the type shown in FIG. 5, a wall portion 20 extending vertically from the locking structure, preferably in spaced relationship thereto, and a ledge 21 projecting from the vertical wall portion at a level corresponding to the height of the tops of the load-supporting flanges 13 of the floor sections. Through the spacing provided by the locking structure, the corner extrusion provides a continuously extending air channelway at the extremity of the floor adjacent the side wall, as well as a slot communicating therewith. Instead of using angle pieces at the outermost longitudinal edges of an assembly of floor sections where the side walls join the floor, the portions projecting outwardly from the outermost webs of the outermost sections may be omitted or removed and the provision of apertures in such webs also may be omitted whereby the outermost webs will then constitute closure walls at the sides of the intercommunicating ductway system therebetween.

Figure 6:
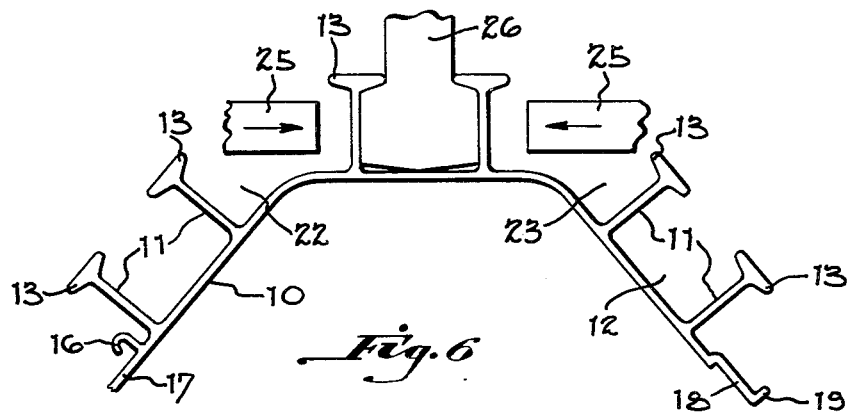
FIG. 6 is an end elevational view of a floor section made of extruded aluminum and being of generally inverted V formation in end elevation to facilitate piercing of the section webs to provide cross flow apertures therein.
Figure 9:
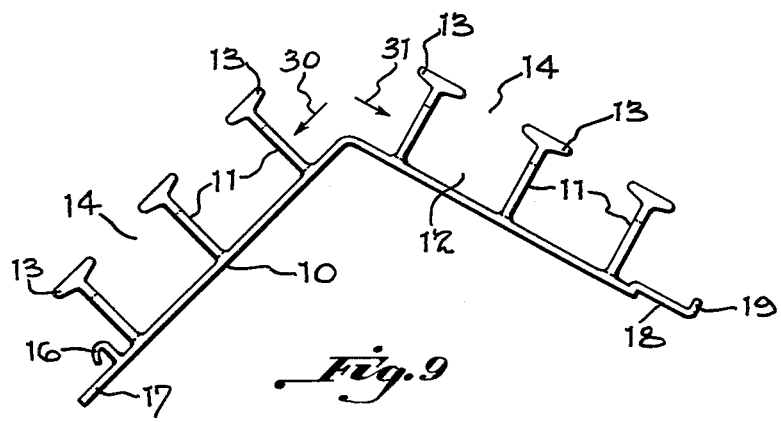

Inasmuch as the floor sections utilizing the advantages provided by the present invention are fabricated most conveniently by extrusion, it will be seen that the apertures 15 in the webs 11 thereof have to be provided subsequent to the extrusion, but it will also be seen that the extensions of the flanges 13 from the tops of the webs make the webs relatively inaccessible. However, FIGS. 6 and 9 show forms of extrusion which facilitate piercing of the webs to provide the cross holes. The section, as extruded, transversely is of circular, or truncated V form whereby adjacent webs at the right and at the left diverge arcuately or angularly in opposite directions from each other or from one or more webs at the center, such that a line passing through the one set of webs clears the flange of the web nearest the vertex angle of the adjacent set of webs. Such divergence provides open areas 22 and 23 between the right and left-hand webs or sets of webs and the center web or set. Through these clearance areas a suitable tool may be applied to pierce the webs, either singly or in sets. For example, a tool such as an end mill 25 may be applied to either of the center webs as shown, or to both at once, to mill elongated apertures 15 therein at spaced intervals, or a drill may be used if round rather than elongated apertures are desired. The operation may be duplicated by subsequently bringing the right and left-hand webs to the tooling. In the alternative, a die 26 may be inserted between the adjacent webs of a set so as to support the webs while punches, also indicated at 25, 25 may be applied simultaneously to the outer faces of the two webs of the set.

Figure 7:
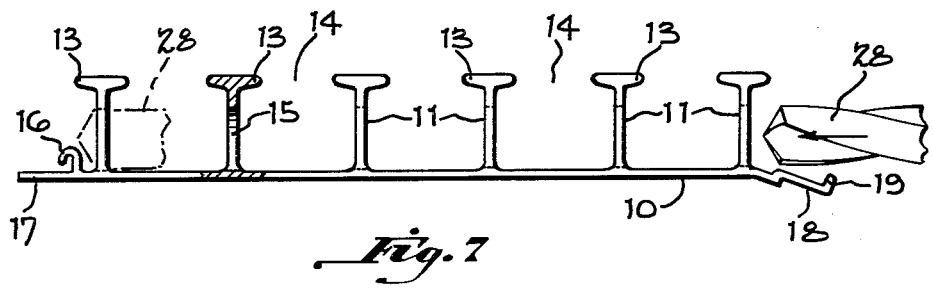
FIGS. 7, 8 and 9 are views similar to FIG. 6 showing alternative methods of forming cross flow apertures.

Other methods of forming the apertures 15 may be employed. As indicated in FIG. 7, the strip 18 may be bent downwardly below the upper surface of the bottom panel portion 10. The downward bending of the strip 18 permits a drill 28 to form apertures 15 in all of the webs, the movement of the drill with respect to the section being blocked before the drill engages hook portion 16 as shown in broken lines at the left side of FIG. 7.

Figure 8:
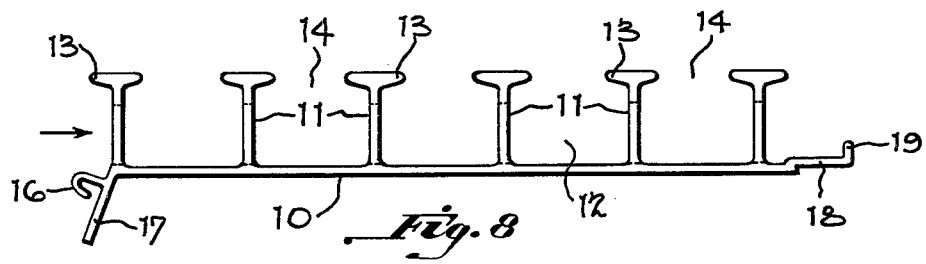

In similar manner, apertures may be formed in the section in the manner illustrated in FIG. 8. There the ledge 17 is bent downwardly to an included angle of less than 180° until the hook portion 16 is below the upper surface of the bottom panel portion 10. When bent in this manner, a drill can clear the top of the interlocking member and still pass through the consecutive webs 11 forming apertures in a manner similar to that shown in FIG. 7. A similar alternative method is as shown in FIG. 9 wherein the section is bent or extruded to shape along a vertex line residing anywhere intermedial the sides of the panel but parallel thereto and a drill passed through the webs of one side of the section as indicated by the arrow 30 and thereatfer passed through the webs on the other leg of the section as indicated by the arrow 31.

In all embodiments, the apertures may have their lower extremities approximately flush with the upper surface of the bottom panel portion 10. It is to be understood, of course, that following the aperture forming operation, the sections are bent into functional alignment to restore them to the configuration illustrated in FIG. 4.

In the operation of the invention, the floor of the cargo body is formed by connecting the first section to the strip 18 secured to the corner extrustions illustrated in FIG. 5. Thereafter succeeding sections are joined to their adjacent sections until the complete floor is laid.

In use, air circulates freely around the interior of the cargo body as permitted by the apertures 15 and the channelways 12 in the floor section. If moisture condenses on the floor of the vehicle, the dams provided by the hook portion 16 and the flange 19 prevent such condensation from passing through the joint between sections and soaking the batting beneath the floor. Since the apertures 15 are flush with the upper surface of bottom panel portion 10, there is no consequental buildup of condensed moisture anywhere in the floor of the cargo body.

Having described my invention, I claim:

1. A flooring section in the form of an elongated metal extrusion comprising a bottom panel portion, a plurality of webs extending longitudinally of said section from said bottom panel portion in spaced relationship to one another, said webs having flanges extending transversely therefrom at their ends in uniformly spaced relation to said bottom panel portion from which the webs respectively project, the edges of the flanges of adjacent webs being spaced from one another, a first joint member projecting upwardly from said bottom panel portion and longitudinally along one edge portion of said section, said first joint member being spaced from the adjacent web, a second joint member projecting upwardly and extending longitudinally along the opposite edge portion of said section, said second joint member being spaced from the adjacent web, said webs each having a plurality of longitudinal spaced apertures having their lower extremities substantially flush with said bottom panel portion.

2. A flooring section in the form of an elongated metal extrusion comprising a bottom panel portion, a plurality of webs extending longitudinally of said section from said bottom panel portion in spaced relationship to one another, said webs having flanges extending transversely therefrom at their ends in uniformly spaced relation to said bottom panel portion from which the webs respectively project, the edges of the flanges of adjacent webs being spaced from one another, a first joint member projecting upwardly from said bottom panel portion and longitudinally along one edge portion of said section, said first joint member being spaced from the adjacent web, a second joint member projecting upwardly and extending longitudinally along the opposite edge portion of said section, said second joint member being spaced from the adjacent web, said webs each having a plurality of longitudinal spaced apertures having their lower extremities below the upper extremities of said joint members.

3. A floor construction for a refrigerated cargo body, said construction comprising a plurality of sections disposed in side by side relation, each said section being in the form of an elongated metal extrusion including a bottom panel portion, a plurality of webs extending longitudinally of said section from said bottom panel portion in spaced relationship to one another, said webs having flanges extending transversely therefrom at their ends in uniformly spaced relation to said bottom panel portion from which the webs respectively project, the edges of the flanges of adjacent webs being spaced from one another, a male joint member projecting upwardly from said bottom panel portion and longitudinally along one edge portion of said section, said male joint member being spaced from the adjacent web, a female joint member projecting upwardly and extending longitudinally along the opposite edge portion of said section, said female joint member being spaced from the adjacent web, said male and female joint members of adjacent sections cooperating to form a joint between adjacent sections, and said webs each having a plurality of longitudinal spaced apertures having their lower extremities below the upper extremity of said joints.

References Cited in the file of this patent
UNITED STATES PATENTS

| | | |
|---|---|---|
| 2,231,208 | Crede | Feb. 11, 1941 |
| 2,388,968 | Hedgren | Nov. 13, 1945 |
| 2,458,686 | Davie | Jan. 11, 1949 |
| 2,625,118 | Lechner | Jan. 13, 1953 |
| 2,754,581 | Thomas | July 17, 1956 |
| 2,810,191 | Hanna | Oct. 22, 1957 |
| 2,878,904 | Fanner | Mar. 24, 1959 |
| 2,907,417 | Doerr | Oct. 6, 1959 |
| 2,923,384 | Black | Feb. 2, 1960 |
| 2,952,341 | Weiler | Sept. 13, 1960 |

OTHER REFERENCES

Designing with Aluminum Extrusions, Reynolds Metal Co., copyrighted 1950, page 14.